United States Patent [19]

Porath

[11] 4,423,158
[45] Dec. 27, 1983

[54] ION ADSORBENT FOR METALS HAVING A COORDINATION NUMBER GREATER THAN TWO

[75] Inventor: Jerker O. Porath, Lidingö, Sweden

[73] Assignee: Gelinnovation Handelsaktiebolag, Lidingö, Sweden

[21] Appl. No.: 461,512

[22] Filed: Jan. 27, 1983

[51] Int. Cl.$^3$ .............................................. B01J 39/18
[52] U.S. Cl. ........................................ 521/32; 536/56; 536/102; 536/112; 521/27; 521/25
[58] Field of Search ............... 521/32, 27, 25; 536/56, 536/112, 102

[56] References Cited

U.S. PATENT DOCUMENTS

| | | | |
|---|---|---|---|
| 3,899,472 | 8/1975 | Aya et al. | 521/32 |
| 4,152,493 | 5/1979 | Yotsunoto et al. | 521/32 |
| 4,277,566 | 7/1981 | Kataoka et al. | 521/32 |
| 4,343,920 | 8/1982 | Kahovec | 536/56 |

OTHER PUBLICATIONS

J. Porath et al., Nature 258 (1975), pp. 598 and 599.
J. Porath, J. Chromatogr. 159 (1978), p. 23.
F. Helfferich, Macmillan Journals Ltd. (1961), pp. 418 to 420.

Primary Examiner—Joseph L. Schofer
Assistant Examiner—Peter F. Kulkosky
Attorney, Agent, or Firm—Fisher, Christen & Sabol

[57] ABSTRACT

Metal ion adsorbent that is formed by an organic polymer having a hydrophilic character through a content of an average of at least 0.5 substituents per monomer unit of any of the following types: OH, O, CO, $NH_2$, NH or N, so that the concentration of these groups is at least 25 mol-percent. The polymer in a non-aqueous state contains at least 10 $\mu$mol of metal binding groups per gram of adsorbent. The metal binding group has 5 coordinating ligand atoms, two of which are nitrogen atoms and three of which are carboxylic acid groups.

10 Claims, No Drawings

ION ADSORBENT FOR METALS HAVING A COORDINATION NUMBER GREATER THAN TWO

BACKGROUND OF THE INVENTION

1. Field of the Invention

The present invention relates to a metal ion adsorbent.

2. Prior Art

It is known that by introducing a chelate forming group into a polymer, such as, polystyrene, there is obtained an adsorbent for bivalent or multivalent metal ions. Such a chelate adsorbent usually binds the metal ion stronger and more selectively than the usual, non-chelating ion exchangers.

It is furthermore known that a cross linked polymer with chelate forming groups which are charged with metal ions (such as bivalent copper or zinc) could be used for adsorption of substances which coordinate with these metal ions. Chromatography based on this principle has been denoted "ligand exchange chromatography" (F. Helfferich, J. Amer. Chem. Soc. 84 (1962) 3242). Ligands such as water, buffer ions, etc., could be exchanged for the adsorbing substances.

Also high molecular substances, such as proteins could be adsorbed to the metal ions fixed in the matrix. This embodiment of the chromatographic procedure has been denoted metal chelate affinity chromatography (J. Porath et al., Nature 258 (1975)598).

The phenomenon metal chelate adsorption could also be used in batch procedures where a solution containing substances having an affinity to the polymer attached metal is brought in contact with the metal (i.e., suspended in the solution). After the adsorption the gel is removed and washed whereafter material adsorbed can be diluted by means of changing the composition of the medium (change of pH, change of salt or by means of introduction of a chelating substance). The metal chelate adsorption could also be used for immobilizing proteins, such as enzymes, antibodies and antigens.

In adsorption-desorption procedures including biopolymers such as protein or nucleic acids, an hydrophilic matrix has been used to which a chelate forming group has been bound covalently. It is important that the gel matrix is hydrophilic as one would otherwise obtain a strong mutual effect between the protein and the matrix substance in a water solution ("hydrofob adsorption"). The selectiveness and specific character of the adsorption is not achieved in strong hydrofob adsorption and the product will not be useful for protein- and nucleic acid purification.

In order to obtain an optimal function the metal ion should be bound so strongly to the carrying polymer matrix that it is not desorbed (released) under the conditions useful for carrying out the adsorption-desorption procedures in a batch or at chromatography. Usually, these procedures are performed in the temperature range of 0°–40° and within a pH-range of pH 3–10. The metal ion shall not be removed from the polymer by substances which are normally contained in the solutions or extracts which are subject to the process. The extracts from organisms often contain ammonium, amines, amino acids or other metal coordinating substances. The metal is not removed by these substances from an ideal chelate adsorber.

On the other hand, the metal ion has to have a certain residual affinity so that proteins and the above mentioned substances can coordinate with the metal (without removing the metal from the polymer attached ligands). Metal ions like zinc, iron, cobalt, etc., usually coodinate with 6 ligands. If all of the ligands are fixed into the matrix there is no residual affinity for ligands containing substances of a lower metal affinity than that of the polymer fixating ligands in the surrounding solution—the metal ions are coordinately saturated with strong ligands. If, however, many "free" coordination positions are available the metal ion often is too loosely bound to the polymer and is removed from the gel simultaneously with the adsorbed protein at the desorption. Furthermore, the adsorbent is less well defined considering the adsorption properties of the metal chelate group. Different metal chelate groups get different contents of the ligands adsorbed from the solution (due to different steric surrounding).

The group hitherto normally used is the iminodiacetate group:

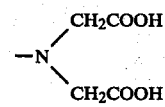

This group together with a copper ion forms the following chelate:

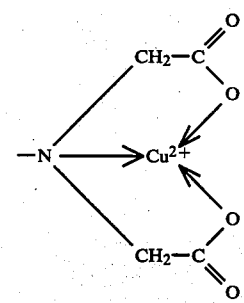

This group gives the copper three polymer bound and three free ligands.

The following group has also been used with Sephadex as a carrying polymer matrix:

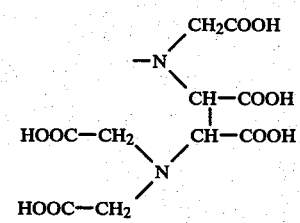

(see J. Porath, J. Chromatogr 159 (1978) p. 23).

Here 7 metal coordinating atoms are present: 2 N and 5 O from the carboxylic groups. In accordance with the discussions above this number of ligands is unsuitably high. A group according to this formula could form a metal ion for instance $Cu^{2+}$(a), but when this is the case a further metal ion can be formed and this second metal ion (b) is:

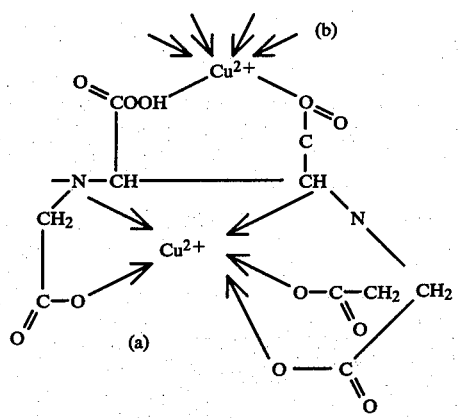

The difference is obvious. The metal ion (a) is more strongly bound to the adsorbing element than the metal ion (b). On the other hand, four free coordinating positions are available at (b) but only one at (a) which implies that (b) more strongly ties the ligand substances in a solution. An adsorbing means having so many ligands atoms for each metal binding group will therefore be relatively heterogeneous.

BROAD DESCRIPTION OF THE INVENTION

It is an object of the present invention to provide a metal ion adsorbent having chelating groups each of which having a suitable number of ligands and a suitable distribution of these ligands. The metal ion adsorbent according to the invention furthermore has optimized properties for metal chelate adsorption chromatography where the metal is or could be hexa-coordinated. The adsorbent according to the invention is characterized by the fact that each group contains five coordinated atoms of which two are aliphatically or alicyclically bound nitrogen atoms and three are oxygen atoms of carboxylic groups. In the absorbent according to the invention the nitrogen atoms are separated by an ethylene bridge to which—in addition to nitrogen—hydrogen or a lower alkylic group or alicyclically bound carbon is bound. One of the nitrogen atoms is furthermore bound to the polymer and to an α-carboxy-α-alkylmethyl group or a carboxy-methyl group and to the other nitrogen atom two such groups are bound, thus:

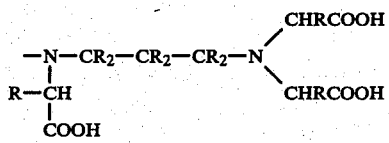

In this structure the metal binding group of the adsorbent structurewise resembles ethylene diamine tetra acetic acid (EDTA). It is a characteristic of a group in an adsorbent according to the invention that a hexa-coordinated metal atom (at least theoretically) can form four 5-armed rings each of which contains a metal and nitrogen and leaves one coordination position free for interaction with a ligand substance in the solution. If R=H one will thus obtain:

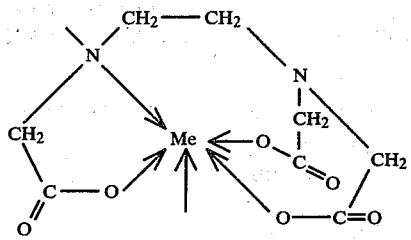

The most ideal adsorbent is obtained if R=H, but also if R=CH₃ or R=C₂H₅ useful adsorbents are obtained.

A further variety of the product having the required characteristics is the following:

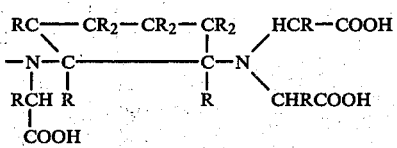

where R is hydrogen or a lower alkyl, preferably hydrogen. This variety II is more hydrophobic than I (in the cases where R=H), this drawback however being compensated by a higher metal complex stability. The product in both of its varieties will however generate very strong complexes with bivalent or threevalent metal ions, i.e., these ions are efficiently adsorbed, especially in a pH exceeding 7.

The substance according to the invention is thus an ion exchanger but differs from a non-chelating ion exchanger in its ability to find metals having a coordination number $\geq 2$. This difference is especially important if the coordination number is above 4. Consequently, a much lower competition from univalent cations is obtained. Cadmium, cobalt, nickel, zinc, iron, etc., are strongly adsorbed even in the presence of high concentrations of for example 4 M NaCl. Ammonium salts, amines, aminoacids such as glycine, etc., form complexes with metals such as copper but an adsorbent according to the invention in the presence of these substances binds transfer metals and other multivalent metals stronger than conventional ion exchangers. In the neutral pH area zinc and copper ions can thus be fixed so strongly in a layer of the product according to the invention that it is not eluted by 1 molar glycine. In this respect the product is superior to corresponding adsorbents based on iminodiacetate as a metal fixing ligand group. Thus, by using an adsorption substance according to the invention heavy metals can be extracted from solutions having a high concentration of light metal salts. An area of use is thus the concentration of heavy metals from sea water. In suitable varieties with respect to the choice of matrix (see below) it should be possible to use the product for purification of industry or mining water and for preparation of ultra-pure drinking water. The product can also be used for separating heavy metals from each other.

As indicated above the product according to the invention in a metal charged state is an adsorbent for substances having metal affinity. By choosing a highly permeable hydrophilic matrix the product, especially in a metal charged state, is an adsorption means for biopolymers such as proteins, peptides, nucleic acids, etc. Also other substances having a metal affinity, such as amino acids, amines, phenols, mercapto compounds, etc., are adsorbed and can be desorbed from a metal chelate gel. By charging a layer of particular gel according to the invention with cadmium ions one can specifically catch proteins from serum which has an affinity for cadmium. On a zinc gel proteins binding zinc could be caught. On a series of gel layers where the layers contain different fixed metal ions and where the layers are coupled in tandem a mixture of proteins can be separated according to the different affinities of the proteins to the respective metals. The composite column can then be demounted and the adsorbed material can be eluted separately from each layer. The elution can be made in different ways: by changing the pH or by introducing into the eluting medium competing substances. What could be very useful (and here is another difference as compared to the "usual" ion exchanger) is the possibility of introducing a very strongly chelate forming substance in the eluting material such as ethylene diamine tetra acetic acid (EDTA). This technique has been described previously (J. Porath et al., Nature 258 (1975) 598) however not by using a product according to the present invention. By using this product sharper separations are obtained and furthermore, the metal ions are more strongly fixed to the polymer matrix. The improved separations are not predictable in quantitive terms and have been shown to be surprisingly good.

The matrix of the adsorbent, i.e. the carrier of the metal chelating groups, could be of a different nature. It could be nonsoluble, e.g. a particle gel forming substance. The matrix could be thread- or net shaped. It could also be a water soluble polymer. As an example of suitable gel forming matrix agar and agarose and other polysaccharides from marine algae, dextrane, cellulose and unsoluble starch can be mentioned. These substances can often by preference exist in a cross linked state. Suitable synthetic matrix material are polyvinyl alcohol, polyamides of the nylon type and polyacrylacids derivatives such as polyacrylate, especially hydroxyalkylpolyacrylate (Spheron) and polyacrylamides, e.g. hydroxymetylized acrylamides ("Trisacryl GFO5"). To obtain a gel product each derivative should be cross linked. Cellulose and cellulose derivatives can be used as a matrix and could then possibly be designed as paper sheets.

The adsorbent according to the invention can also be used as a water soluble adsorbent for heavy metal ions or in a metal charged state for forming complexes of natural products or synthetic substances having a metal affinity. It is then important to be able to separate the soluble substance after the adsorption by means of precipitation or by dialytic procedures or possibly through ultracentrifugation or molecule filtration. The matrix of the product should then have a molecular size which facilitates its separation stages. A sharp limit could not be set up, but the molecular weight of the polymers should exceed 5000 dalton. Suitable solvable matrixes are soluble starch, dextrane, polyvinyl alcohol, polyethylene glycols or simple derivatives from these (e.g. monoeters or esters of polyethylene glycol etc.). Also other soluble polymers are possible, they should however have such a chemical composition that the specific character of the product is reduced. High concentrations of other strong ligand groups in addition to the characteristic metal chelating groups should not be present. Thus, matrixes having high concentrations of carboxyl, free amino groups (not amides), thiol groups could thus not be used. One is here dealing with relative concentrations and in order to avoid strong disturbances the ratio between charactristic metal chelating groups to other metal binding groups should exceed 10. This eliminates most pure proteins as matrix material, but compound polymers of for example e.g. proteins and low molecular substances such as oligoglucanes could be used for matrixes in the product according to the invention. A cross linked copolyderivate of dextrane or starch and gelatine could be mentioned as an example.

Characterization of the above mentioned matrixes is their hydrophilic features. According to the invention these features can be defined in chemical terms. Thus, all these matrixes have a high molecular weight ($>5000$ dalton) which often results in that they are nonsoluble and will swell in water into gels. The water affinity is characteristic and is in all instances dependent on an even distribution of a high number of hydrophilic groups in the matrix. These groups are of the following type: $OH$, $NH_2$, $NHR$, $NR_2$, $CONH_2$, $CONR_2$, $O$ in etherbinding: $OCH_3$, $—CH_2—O—CH_2—CH_2—O—$, heterocyclic oxygen and nitrogen and $CO$. They should be present in sufficient amounts to give the matrix the desired hydrophilicity. In the above given example the number of hydrophilic groups gives the matrix a content of these groups exceeding 25% of the weight of the dry substance (polysaccharides 40–50%, polymetaacrylamide 51.4%, polyacrylamide and polyacrylate $>52\%$, polyethylene glycols $>36.4\%$). When introducing the characteristic metal binding groups the elimination of one hydrophilic group is replaced by several hydrophilic groups (N and COOH), the product according to the invention thus usually being more hydrophilic than the unsubstituted matrix. It is also a characteristic that the groups are more or less evenly distributed within the complete matrix and that the matrix is formed by a polymer where each monomer unit contains at least one hydrophilic group. The product according to the invention will thus contain at least 25% hydrophilic groups of the above defined type.

It should be noted that the product according to the invention for certain purposes could be mixed with other substances. This means that for such applications (for instance purification of industry water) the starting material for producing the product could be mechanical paper pulp, saw dust or other waste material containing cellulose or hemicellulose. The adsorbent could also be coated as a layer around the hydrofobe of non-waterabsorbing material or be present as a matrix in which such material are embedded.

DETAILED DESCRIPTION OF THE INVENTION

The product according to the invention can be produced in several ways. Usually reactive groups have to be introduced into the carrier material. However, such groups might already be present in the matrix, e.g. ketogroups (which could be condensed with amino groups and thereupon reduced). As suitable reactive groups could be mentioned

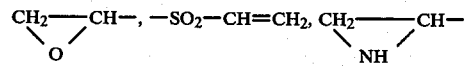

and active halogen. The metal binding groups could thereupon be introduced in one or two steps which can be described for variety I with R=H as follows:

Method 1

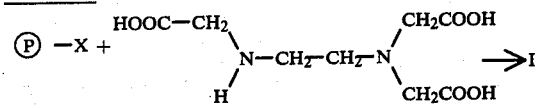

Method 2

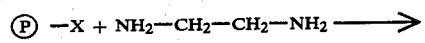

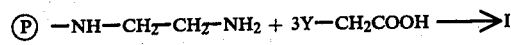

where Ⓟ is the polymer matrix substituted with X which is the reactive group and where Y is an halogen, preferably chlorine or bromine. The reaction is suitably carried out in alkaline water environment or in an organic solvent in the presence of a catalyst.

It should however be noted that the product can be produced by other means, e.g.:

Method 3

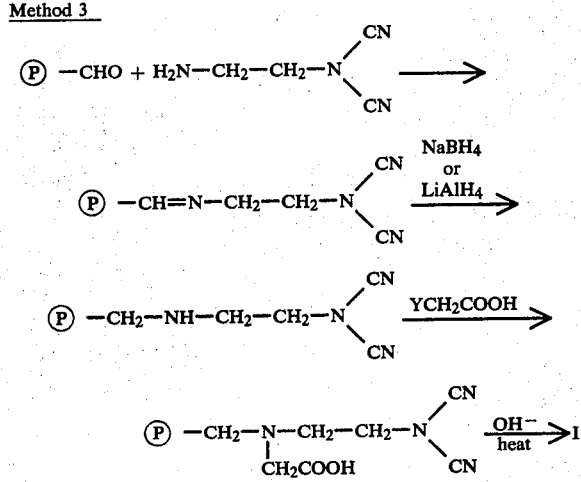

The method 2 is presumably the simpler one considering the starting materials. This method is also suitable for analogue derivatives, e.g. where the ethylene diamine is exchanged for 1-2 diaminopropyle or 1-2 diaminobutane or 1,2-diaminocyclohexane (see example III 6 and 12) for producing a product according to variety II where R=H. One could also produce an adsorbent according to the invention starting from an amine containing polymer by treating this polymer with glutaraldehyde and a subsequent reduction and carboxylation.

The product according to the invention can also be given varying properties through the structure of the spacer which separates the metal binding group from the gel matrix. This spacer group is often a carrier of the reactive substituent to which the metal binding group is fixed. If, for instance, epichlorhydrine is used for activating the matrix —O—CH$_2$—CHOH—CH$_2$— is obtained as a spacer group (where one oxygen from an original OH group in the matrix has been included). With a bisepoxide such as n-butanediolbisglycidylether the following spacer is obtained: —O—CH$_2$—CHOH—CH$_2$—O—CH$_2$—CH$_2$—CH$_2$—CH$_2$—O—CH$_2$—CHOH—CH$_2$. Such a long spacer could be advantageous or necessary in order to make the metal chelate group reach the interior of a protein molecule. Even longer spacer groups could be designed, e.g. with polyethyleneglycol. With a sufficient degree of polymerization a mono- or disubstituted polyethyleneglycol is as such a variety of the invention, for example:

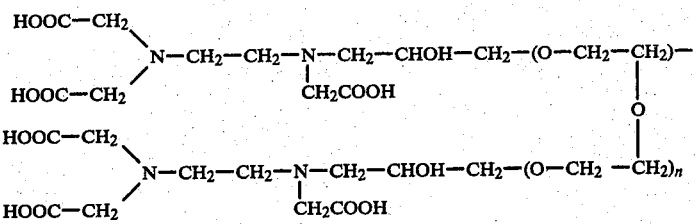

where $n \geq 50$ the derivative of the molecular weight exceeding 5000. It has a content of metal chelate forming groups according to the invention which exceeds 9%. At a unilateral substitution the concentration of metal binding group is more than 4%. As n increases the ability for the product to bind a metal is reduced, calculated on each unit of weight. In order to obtain an efficient metal chelating effect the product should contain at least 0.5% of weight metal binding groups. This is true for the product in all its varieties, that is also when it exists at gel particles.

The use of the product according to the invention will now be illustrated by means of a number of examples which also illustrate varieties and some different forms of the products according to the invention.

Production of a product according to the variety I:

EXAMPLE 1

0.5 kg Sephadex G-25 (crosslinked dextrane absorbing approximately 2.5 g of water per gram) is treated with 2.5 l of 0.8 M NaOH and 120 ml of epichlorohydrin. After one hour further 500 ml of 4 M NaOH and 240 ml of epichlorhydrin is added. The suspension is left over night while agitated. The gel is washed in water, 10% acetic acid, water and 0.2 M NaHCO$_3$.

To the gel 300 ml of ethylenediamine and 600 ml of 0.2 M NaHCO$_3$ are added and the suspension is stirred in a reaction flask, is heated to 50° C. and is left at this temperature for 8 hours. The gel is then again washed with water, 10% acetic acid, water and 0.2 M NaHCO$_3$.

In a five liter round flask 375 g of bromo acetic acid, 120 g of NaOH and 800 g of water is introduced, whereafter pH is adjusted to 9 with solid NaOH. The gel is added and the suspension is stirred over night at room temperature. The gel is washed with water, 10% acetic acid and water. From 0.5 kg of crosslinked dextrane 2.2 kg of readymade swelled gel absorbing 38 µmol of Cu$^{2+}$ per ml of gel is obtained. The major part of the copper ions were not eluted with 1 M glycine but with 0.1 M sodium salt of ethylene diamine tetra acetic acid pH 7.

EXAMPLE 2

700 g of 4% swelled bead agarose is mixed in a 5 liter reaction flask with 460 ml of 2 M NaOH and 50 ml of 1.4 butanedioldiglycidylether. 460 ml of 2 M NaOH and 230 ml of bisepichlorhydrin is added batchwise during about 1½ hour during stirring. The reaction is allowed to continue overnight. The gel is washed with water, diluted acetic acid, water and 0.2 M $NaHCO_3$.

The gel is transferred into a reaction flask and 300 ml of 0.2 M $NaHCO_3$ and 200 ml of ethylene diamine is added. The gel is heated in a water bath to 50° C. and is stirred for 20 hours.

The gel is washed with water, diluted acetic acid, water and finally with 1 M $Na_2CO_3$. The gel is transferred into a reaction vessel. 125 g of bromo acetic acid dissolved in 400 ml of 2 M NaOH and 400 ml of 1 M $NaHCO_3$ is added and the pH is adjusted to 11.3 with solid state NaOH. After 16 hours of stirring the reaction is interrupted. The gel is washed with distilled water, diluted acetic acid and distilled water. From the product a sample is taken and is tested with respect to its ability to adsorb copper ions. 27 µmol $Cu^{2+}$ was adsorbed per ml of gel.

EXAMPLE 3

5 g partially hydrolyzed starch was dissolved in 50 ml of 0.6 M NaOH in a 250 ml Erlenmeyer flask. 10 ml of epichlorhydrin is added and the contents were shaken overnight. The starch put through this treatment was transformed into a gel. The gel was washed with water, 0.1 M $Na_2CO_3$ and mixed with 2 ml of 1.2 diaminocyclohexane and 20 ml of 0.1 M $Na_2CO_3$. After shaking in 4 hours the gel was washed with water and with 1 M $NaHCO_3$. The gel was transferred to a flask containing 6 g of chlorine acetic acid dissolved in 20 ml of 1 M $NaHCO_3$ to which solid state NaOH was added to obtain a pH of 10. The gel suspension was shaken at 50° C. overnight. The gel was transferred onto a filter and was washed with water and with diluted copper nitrate solution to saturation. The adsorbed copper was not removed by acetate or trisbuffer in the pH-range of 4–9.

EXAMPLE 4

5 g of Biogel 10, a crosslinked polyacrylamide, was treated according to Example 3 with the difference that 1.2 diaminecyclohexane was exchanged for ethylediamine. The gel did absorb a great amount of copper ions and was given a deep dark blue color.

EXAMPLE 5

5 g of cotton was treated according to Example 4. The product while maintaining the fiber structure of cotton was coloured intensively blue.

EXAMPLE 6

5 g of cotton was treated according to Example 5 with the difference that the ethylenediamine was exchanged for 1.2 diamino-n-butane. The product adsorbed copper and could not visually be separated from the product according to Example 5.

EXAMPLE 7

Sponge (5 g) was treated in accordance with Example 5. The product obtained a green color in contact with copper ions. The green color could not be removed with a strong complex former, e.g. EDTA.

EXAMPLE 8

5 g of cellulose powder was treated with 2 g of cyanochloride in 25 ml of 0.2 M $Na_2CO_3$ for 30 minutes. The powder was washed with water and thereafter with 0.2 M $Na_2CO_3$. The powder was transferred to a reaction flask and 2 ml of ethylene diamine and 25 ml 0.2 M $Na_2CO_3$ were added. After 3 hours the sample was taken out and was tested with copper nitrate solution. Copper was adsorbed; thus, ethylene diamine had been coupled with cellulose. Thereafter a bromo acetate treatment according to Example 3 was carried out. The end product adsorbed copper ions more strongly than the intermediate product, which could also be proven with an elution experiment with glucine and EDTA, thus the ethylene diamine substituent had been carboxymethylated.

EXAMPLE 9

This example was carried out as Example 8 with the exchange of 3 g of 3,6 dichlorpyridazine for 2 g of cyanurchloride. The end product did absorb copper.

EXAMPLE 10

50 ml of 0.2 M $Na_2CO_3$ was poured over 5 g of dyalisis tubing (cellulose acetate) in a 250 ml of flask and 0.5 ml divinylsulfone was added. After 20 minutes the solvent was removed. The tubing was washed with distilled water and with 0.2 M $Na_2CO_3$. The tubing was then transferred into a flask with 1.2 M $Na_2CO_3$ and 2 ml of ethylene diamine and was left for 24 hours. The tubing was washed with water and 0.2 M $Na_2CO_3$ and was transferred to a flask. To the flask 50 ml of 0.2 M $Na_2CO_3$ and 2 g of $ClCH_2COONa$ was added. The reaction was carried out at room temperature for 4 hours whereafter the temperature was increased to 60° C. and the reaction was allowed to continue for one hour. The tubing was washed with distilled water and was tested with respect to its copper ion binding properties. A similar copper ion adsorption test was made with a blind sample consisting of a tubing treated in the same way as the real sample with the exception that divinylsulfone had been eliminated. The sample did absorb copper ions considerably more than the blind sample which was only insignificantly colored blue. The copper adsorbed in the blind sample could also be more easily desorbed with glycine solution than the sample tubing. The following examples illustrate how a water soluble metal binding polymer according to the invention can be produced.

EXAMPLE 11

5 g hydrolyzed dextrane having a molecular weight of around 10000 dalton was treated with 2 ml of epichlorhydrin in 20 ml of 0.5 M NaOH. No gel was obtained. The solution was transferred to a dialysis for tubing and was dialyzed 14 hours to water and thereafter during the same time to 0.1 M $Na_2CO_3$. 10 ml of ethylene diamine was added and the solution was left for two days and was then dialyzed to water. The solution was then dialyzed to 1 M $Na_2CO_3$ whereafter 2 g of solid state NaOH and 3 g of bromo acetic acid were added. After 24 hours the solution was dialyzed to water until the dialyzed product had become neutral. 1 ml of 0.1 M copper nitrate was added and the solution was dialyzed to water. Part of the copper ions could not be dialyzed and were thus bound to the polymer.

EXAMPLE 12

Polyvinylalcohol was treated as dextrane in Example 11 above with the difference that ethylene diamine was changed for 1,2-diamine propane. A strongly copper ion adsorbing polymer was obtained.

EXAMPLE 13

1 M sodium hydrogen carbonate solution, pH 8.5, containing a mixture of soluble starch and hemoglobin was brought in contact with a copper containing sponge produced according to Example 7. The sponge did absorb the hemoglobin but left the starch in the solution. The hemoglobin sponge was squeezed, washed with the ammonium carbonate solution, was squeezed again and was allowed to swell in 0.1 M imidazol solution, pH 6.5. The hemoglobin was transferred to the solution. Carbonhydrate and protein could thus be quickly and efficiently separated from one another by means of this method.

EXAMPLE 14

Two layers of 10 ml volume, one of which was filled with cellulose to which iminodiacetic acid was substituted (layer I) and the other (layer II) was made up by a cellulose derivative according to the invention as defined in Example 8, were connected in series. The layers were saturated with nickel ions by means of making a nickel chloride solution in distilled water pass the layer. The excess nickel solution was washed out with water and 1 M glycine. Almost all nickel left the iminoacetic gel while the nickel contents of the tricarboxymethylethylene diamine gel was reduced insignificantly. The layers were washed with 0.1 M trishydrochloride, pH 8. 10 ml of an extract from cow liver, adjusted to pH 8 and released of undissolved material was introduced in the coupled layers. The major part of protein adsorbed was found in layer II and could be diluted by means of washing with 0.1 M sodium acetate. The experiment showed that the chelating iminoacetic acid could not keep the nickel ion whereas the gel according to the invention is a good protein adsorbent. Electrophoretic analysis of non-absorbed protein and protein removed from the gel according to the invention showed that a sharp separation of the protein component of the liver extract had been obtained.

EXAMPLE 15

A 0.1 M $NaHCO_3$, pH 9.0 solution of cytochrome c, 0.1%, was brought in contact with a dialysis tubing according to Example 10 which was saturated with tallium (III) chloride. The tubing adsorbed all color from the solution, i.e. cytochrome was adsorbed to the dialysis membranes. The cytochrome could be eluted from the membranes with 0.1 M imidazol.

EXAMPLE 16

Two 10 ml layers of Fe (III)-gels were connected in series. Layer I consisted of an agar gel according to Example 2, layer II of an analogue agar gel with iminodiacetate as a metal chelator substituent. The gel was washed with 0.1 M sodium acetate, pH adjusted to 5.5 5 ml of human blood serum dialyzed to the acetate buffer, was introduced into the column which was then washed with acetate buffer. Three fractions were obtained: (a) non adsorbed material, (b) adsorbed material in layer I and (c) material absorbed in layer II. The major part of the material in layer I and layer II was desorbed from the layers with 0.1 M tris-HCl, pH 8.0. Electrophoretic analysis showed that the proteins in the three fractions were of different natures. Serum albumin was lacking in the fraction of the gel according to the invention which is important from a preparative point of view. It should also be noted that Fe(III) is strongly adsorbed to iminodiacetic acid gel(contrary to nickel) but the gel according to the invention also in this case proves its great value as an adsorbent having a high selectivity.

We claim:

1. Metal ion adsorbent, characterized in that it is composed of an organic polymer having a hydrophilic character through a content of an average at least 0.5 substituents per monomer unit of any of the following types: OH, O, CO, $NH_2$, NH or N, so that the concentration of these groups reaches at least 25 mol-percent, the polymer in a non-aqueous state containing at least 10 umol of metal binding groups per gram of adsorbent, and the metal binding group being characterized by five coordinating ligand atoms, two being nitrogen atoms and being carboxylic acid groups, the metal binding group being bound to the polymer as follows:

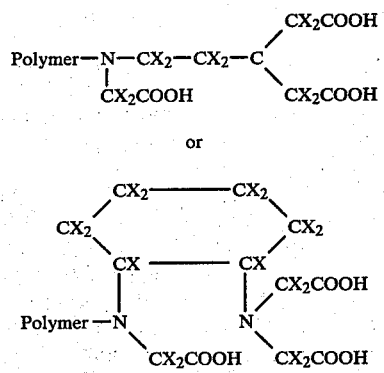

wherein X is H or an alkyl group.

2. Metal ion adsorbent according to claim 1 wherein the polymer is a crosslinked linear or branched organic polymer.

3. Metal ion adsorbent according to claim 2 wherein the polymer is composed of a polysaccharide.

4. Metal ion adsorbent according to claim 3 wherein the polysaccaride is agar, agarose, dextrane, starch or cellulose.

5. Metal ion adsorbent according to claim 2 wherein the polymer is a polyvinyl compound.

6. Metal ion adsorbent according to claim 1 wherein the adsorbent is in the form of particles.

7. Metal ion adsorbent according to claim 1 wherein the adsorbent is in the form of a thread.

8. Metal ion adsorbent according to claim 1 wherein the adsorbent is in the form of a membrane.

9. Metal ion adsorbent according to claim 1 wherein the adsorbent is in the form of a porous polymer sponge.

10. Metal ion adsorbent according to claim 1 wherein X is methyl.

* * * * *

UNITED STATES PATENT OFFICE
CERTIFICATE OF CORRECTION

Patent No. 4,423,158                Dated December 27, 1983

Inventor(s) Jerker Olof Porath

It is certified that error appears in the above-identified patent and that said Letters Patent are hereby corrected as shown below:

Claim 1, the first formula should be corrected to read as follows:

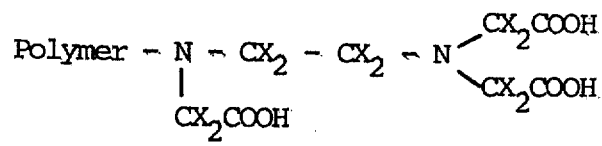

[SEAL]

Signed and Sealed this

Twelfth Day of June 1984

Attest:

GERALD J. MOSSINGHOFF

Attesting Officer           Commissioner of Patents and Trademarks